Patented Oct. 17, 1944

UNITED STATES PATENT OFFICE 2,360,447

METHOD OF CONVERTING HYDROXYSTEROIDS TO KETOSTEROIDS

Leon H. Schmidt and Hettie B. Hughes, Cincinnati, Ohio, assignors to The Elizabeth Gamble Deaconess Home Association, Cincinnati, Ohio, a corporation of Ohio No Drawing. Application July 31, 1941,
Serial No. 404,928

1 Claim. (Cl. 195—30)

Our invention relates to a method for oxidizing hydroxysteroids to convert them to ketosteroids.

Numerous chemical procedures for carrying on this oxidation have been described heretofore, including oxidation by chromic acid, potassium permanganate, potassium dichromate, hydrogen peroxide, and sulfuric acid. Regardless of the particular oxidizing agent used, all of these chemical procedures suffer from a common defect, namely that their action upon the hydroxysteroid is too vigorous and consequently uncontrollable. For that reason, conversion of hydroxysteroids to ketosteroids cannot be stopped at the desired point and compounds other than ketosteroids are formed. Thus these chemical procedures produce relatively small yields of the desired ketosteroid and even these small amounts are impure in that they are contaminated with larger quantities of undesirable oxidation products. Often times these latter products can be separated from the ketosteroids only with the greatest difficulty.

A method for converting hydroxysteroids to ketosteroids is of interest because (1) ketosteroids are widely used as intermediaries or starting materials in the synthesis of many biologically active steroids, including the sex hormones and the hormones of the adrenal cortex, and (2) certain of the ketosteroids have biological activities and uses not possessed by the hydroxysteroids.

In connection with the first point, it may be mentioned that cholestenone, which is a ketosteroid, is a starting material for the synthesis of certain male and female sex hormones and the hormones of the adrenal cortex—compounds which are assuming increasing importance in therapeutic medicine and experimental biology. Cholestenone is not found as such in nature but is synthesized from cholesterol, which is a hydroxysteroid. Cholesterol occurs in all animal cells and is prepared commercially from the brain and spinal cord of animals.

It is the object of our invention to provide a method for preparing ketosteroids which could be subjected to closer control than the above mentioned chemical processes.

Our method comprises the oxidizing of hydroxysteroids by the action of bacteria. We have discovered that such oxidation is superior to chemical processes because it is gentle and not subject to the aforesaid undesirable reaction of the chemical oxidation methods. For instance, chemical methods for converting cholesterol to cholestenone are subject to the above mentioned criticisms of chemical processes, whereas, the bacterial conversion of cholesterol into cholestenone yields a very pure product.

It may also be said that the keto derivatives of the bile acids are frequently used in medical practice in place of the hydroxy derivatives. The most common hydroxy derivatives are cholic and desoxycholic acids. These compounds are frequently administered to patients with digestive upsets, particularly those arising from gall-bladder and liver pathology. Cholic and desoxycholic acids stimulate bile flow, promote digestion and absorption of fats, and increase intestinal peristalsis. Both of these hydroxy steroids have certain undesirable toxic properties, which make it impossible to administer them intravenously and frequently they cannot be tolerated by mouth. The keto derivatives of cholic and desoxycholic acids are much less toxic but are able to stimulate bile flow, etc., as do the hydroxy acids. For this reason, the keto-bile acids are to be preferred to the hydroxy compounds for medicinal use. The hydroxy-bile acids—cholic and desoxycholic acids—are found in large quantities in ox and pig bile. The keto-bile acids must be prepared from the hydroxy compounds. Our bacterial method of preparation is especially suited to production of pure substances.

The essential feature of our process is the conversion of hydroxy compounds to keto compounds by means of the dehydrogenating activity of certain non-pathogenic intestinal bacteria, specifically *Alcaligenes faecalis* and *Escherichia coli*. In our method, the hydroxy-steroid is dissolved or suspended in a simple medium that will support the growth of either of the above bacteria. Then the solution or suspension is inoculated with a small amount of the culture of one of the above organisms and incubated at 37° to 39° C. until the desired conversion is attained. The end product of the reaction, i. e. the keto-steroid derivative, is isolated by conventional, well-defined procedures.

Specific directions for producing this reaction with cholic acid, which is a bile acid, are as follows: First, however, it should be pointed out that cholic acid is a steroid with three hydroxy groups located at positions 3, 7, and 12. The positions 3, 7, and 12 are shown by the following formula of cholic acid:

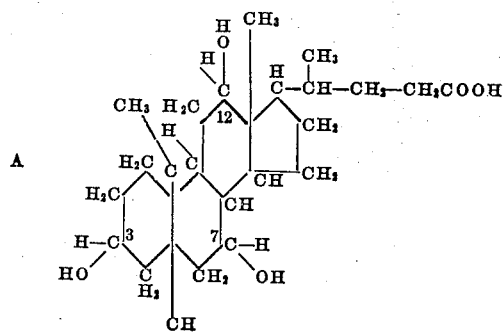

Since all of these hydroxy groups are not acted upon at the same time, more than one keto derivative is obtainable. When all of the hydroxy groups are oxidized to ketones, however, there is formed the 3,7,12 tri-keto derivative of cholic acid. This tri-keto derivative is the end product of the oxidation of cholic acid by *Alcaligenes faecalis*. If the reaction is not allowed to go to completion, mono- or di-keto derivatives of cholic acid are formed. Three mono-keto and three di-keto derivatives can be obtained in addition to the tri-keto compound. The mono-keto derivatives of cholic acid are:

1. A derivative with ketone group at position 3. The position of the ketone group in this derivative is shown in the following formula:

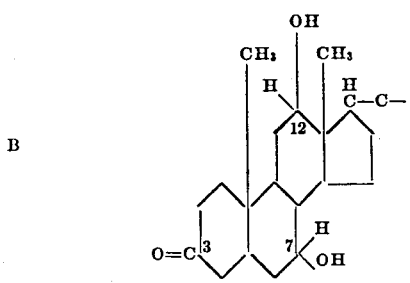

2. A derivative with ketone group at position 7. The position of the ketone group at 7 is shown in the following formula:

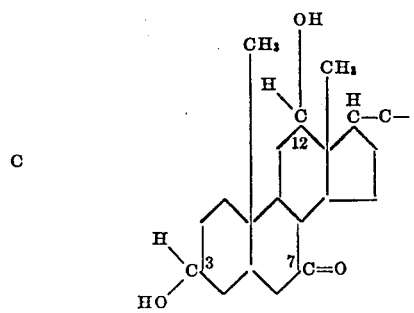

3. A derivative with ketone group at position 12. The position of the ketone group at position 12 is shown in the following formula:

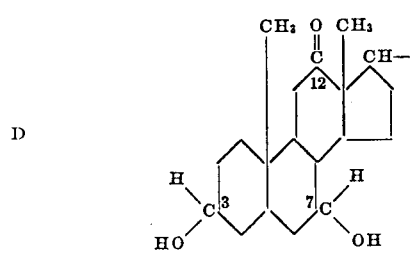

The di-keto derivatives of cholic acid are:

1. A derivative with ketone groups at positions 3 and 7. The positions of the ketone group at 3 and 7 are shown in the following formula:

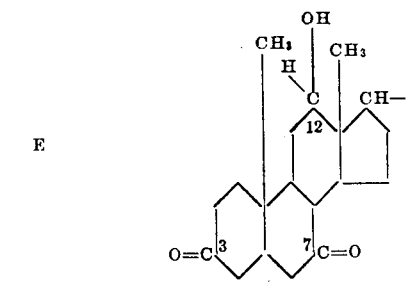

2. A derivative with ketone groups at positions 3 and 12. The positions of the ketone groups at 3 and 12 are shown in the following formula:

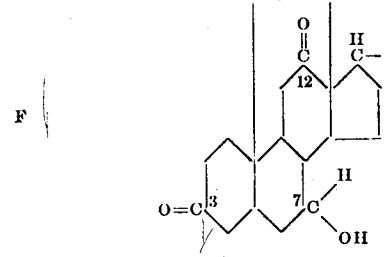

3. A derivative with ketone groups at positions 7 and 12. The positions of the ketone groups at 7 and 12 are shown in the following formula:

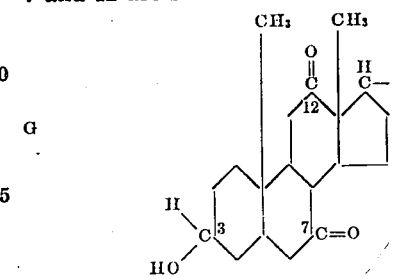

The tri-keto derivative has ketone groups at positions 3, 7, and 12. The positions of the ketone groups at 3, 7, and 12 are shown in the following formula:

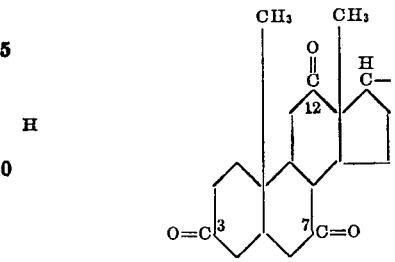

We now describe in detail the steps we take for attaining the derivatives with the ketones in the aforesaid positions B through H, respectively.

First, 0.5 per cent cholic acid as a sodium salt is dissolved in a medium containing

| | |
|---|---|
| Ammonium sulfate | gm__ 4.7 |
| Asparagin | gm__ 0.5 |
| Sodium chloride | gm__ 5.0 |
| Glycerol | gm__ 2.0 |
| Sodium hydroxide | gm__ 0.65 |
| Magnesium chloride | gm__ 0.005 |
| Calcium chloride | gm__ 0.005 |
| Ferrous chloride | gm__ 0.005 |
| Potassium dihydrogen phosphate | gm__ 2.7 | per liter of solution. (Note that any other medium that will support growth of the above bacteria may be used. The media used is the simplest known to us.) The resulting solution is sterilized by autoclaving and is inoculated with 5 to 10 cc. of infusion broth culture of *Alcaligenes faecalis* for every liter of solution used. This mixture is incubated at 37° to 39° C., precautions being taken to insure an adequate supply of air for the solution. This is accomplished either by having a large surface of cholic acid solution exposed to the air or by bubbling sterile air through the above solution.

The length of time of incubation determines which derivatives of cholic acid are produced. Thus, if the incubation period is terminated at the end of two days, the principal products are mono-keto-derivatives of cholic acid; if terminated at the end of four days, the products are principally di-keto-derivatives. If the incubation is carried on for seven days, 99 per cent of the original cholic acid is converted to the tri-keto-derivative. As stated before, actual isolation of the keto-derivative is accomplished with methods defined heretofore.

The procedure can be applied to other bile acids than cholic acid. When a dihydroxy bile acid such as desoxycholic acid is used as a starting material, only three keto-derivatives are produced—two monoketones and one diketone. When a monohydroxy bile acid such as lithocholic acid is used, only one keto-derivative is produced—a monoketone.

Sterols having hydroxy groups at position 3 may also be used as starting materials, and are oxidized to substances having ketone groups at position 3. Thus cholesterol forms cholestenone and the cholestanols form their respective cholestanones.

Male and female sex hormones and related compounds having hydroxy groups at position 3 may also be converted into ketones. Thus androsterone can be converted into androstanedione -3,17. Pregnanolone can be converted into pregnandione.

As stated before, either *Alcaligenes faecalis* or *Escherichia coli* may be used to bring about these reactions. The reaction with *Alcaligenes faecalis* is more rapid than that with *Escherichia coli*. These bacteria are normal inhabitants of the large intestine of man and lower animals. Pure cultures of either of these organisms are readily obtainable by standard culture procedures.

*Alcaligenes faecalis* may be described briefly as a Gram negative rod .5 to 2 microns long, occurring either singly in pairs or sometimes in long chains. *Alcaligenes faecalis* does not ferment carbohydrates, does not produce indole, and grows poorly in broth, forming a viscid sediment.

*Escherichia coli* may be described briefly as a Gram negative rod .5 to 2 microns long, occurring singly in pairs and in short chains. It ferments many carbohydrates, excluding dextrose, levulose, galactose, arabinose, lactose, maltose, raffinose, dextrin, salicin, mannitol, dulcitol and sorbitol. *Escherichia coli* produces indole, a heavy growth in broth with a gray sediment and does not form a pellicle.

We claim:

A method of converting hydroxysteroids to ketosteroids, comprising the inoculating of a medium containing the hydroxysteroid, with a culture of *Alcaligenes faecalis*, then incubating the resulting mixture at a temperature of 37° to 39° C.

LEON H. SCHMIDT.
HETTIE B. HUGHES.